United States Patent [19]

Schmitz et al.

[11] Patent Number: 5,539,602
[45] Date of Patent: Jul. 23, 1996

[54] GROUND FAULT INTERRUPTER

[75] Inventors: Alan R. Schmitz, Johnstown; David J. Farrell, Louisville; Eric J. Norgard, Boulder, all of Colo.; Robert R. Podowski, Mundelein, Ill.

[73] Assignee: GTE Airfone Incorporated, Oak Brook, Ill.

[21] Appl. No.: 325,861

[22] Filed: Oct. 19, 1994

[51] Int. Cl.⁶ .................................................. H02H 3/00
[52] U.S. Cl. ................................................. 361/42; 361/78
[58] Field of Search .............................. 361/42, 78, 86, 361/87, 45, 56

[56] References Cited

U.S. PATENT DOCUMENTS

| | | | |
|---|---|---|---|
| 3,886,932 | 6/1975 | Suessmilch | 361/87 |
| 4,241,372 | 12/1980 | Sears | 361/72 |
| 4,385,336 | 5/1983 | Takeshita et al. | 361/42 |
| 4,947,427 | 8/1990 | Rosch et al. | 361/56 |

Primary Examiner—Jeffrey A. Gaffin
Assistant Examiner—Sally Medley
Attorney, Agent, or Firm—Arnold, White & Durkee

[57] ABSTRACT

A ground fault interrupter, operable in a measurement state, is employed with a DC circuit having a DC power source and a load. The DC source supplies DC current to the load along a supply current path and receives DC current from the load along a return current path. The ground fault interrupter comprises a first resistance in series with the supply current path, a second resistance in series with the return current path, and a current interrupter disposed in series with one of the current paths. The current interruptor interrupts the one of the current paths in response to actuation of the current interrupter. The ground fault interrupter further includes a measurement unit for measuring voltage drops across the respective first and second resistances during the measurement state, obtaining a measurement value using a difference between the voltage drops, and comparing the measurement value to a predetermined threshold. The measurement unit is constructed and arranged to actuate the current interrupter in response to the measurement value exceeding the predetermined threshold.

16 Claims, 1 Drawing Sheet

5,539,602

GROUND FAULT INTERRUPTER

FIELD OF THE INVENTION

The present invention relates generally to ground fault interrupters and, more particularly, relates to a ground fault interrupter for a direct-current (DC) circuit.

BACKGROUND OF THE INVENTION

A ground fault is the accident grounding of a conductor. Conventional ground fault interrupters are employed in alternating-current (AC) circuits and are used to sense very small ground fault currents such as might flow through the body of a person standing on damp ground while touching a hot AC line wire. A ground fault interrupter for an AC circuit is positioned between the AC power source and load. The ground fault interrupter compares the AC supply current flowing from the power source to the load with the AC return current flowing from the load back to the power source. If the supply current differs from the return current by greater than a predetermined threshold, then the ground fault interrupter interrupts the flow of supply current from the power source to the load. To measure AC current differences between the supply current and the return current, the ground fault interrupter employs a toroidal magnetic circuit having a magnetic core and an equal number of supply and return coils of current-carrying wire wound about the magnetic core. The direction of current flow through these coils is designed such that the magnetic flux produced by the supply wire coils is cancelled by the magnetic flux produced by the return wire coils. A third winding is used to pick off any residual flux remaining due to differences in the supply and return currents.

The foregoing technique for measuring current differences between supply and return currents does not work for DC power supplies because the DC current generated by DC power supplies produces a constant magnetic flux which will not produce current in the third winding. To measure the constant magnetic flux, a Hall-effect device could be inserted into a gapped toroidal core. This solution, however, is inefficient and impractical because the number of wire coils wound about the gapped toroidal core would be excessive and factory tuning calibration might be necessary. A need therefore exists for an efficient and practical ground fault interrupter for a DC circuit.

SUMMARY OF THE INVENTION

In one particular embodiment, a ground fault interrupter, operable in a measurement state, is employed with a DC circuit having a DC power source and a load. The DC source supplies DC current to the load along a supply current path and receives DC current from the load along a return current path. The ground fault interrupter comprises a first resistance in series with the supply current path, a second resistance in series with the return current path, and a current interrupter disposed in series with one of the current paths. The current interruptor interrupts the one of the current paths in response to actuation of the current interrupter. The ground fault interrupter further includes a measurement unit for measuring voltage drops across the respective first and second resistances during the measurement state, obtaining a measurement value using a difference between the voltage drops, and comparing the measurement value to a predetermined threshold. The measurement unit is constructed and arranged to actuate the current interrupter in response to the measurement value exceeding the predetermined threshold.

Figure 1:
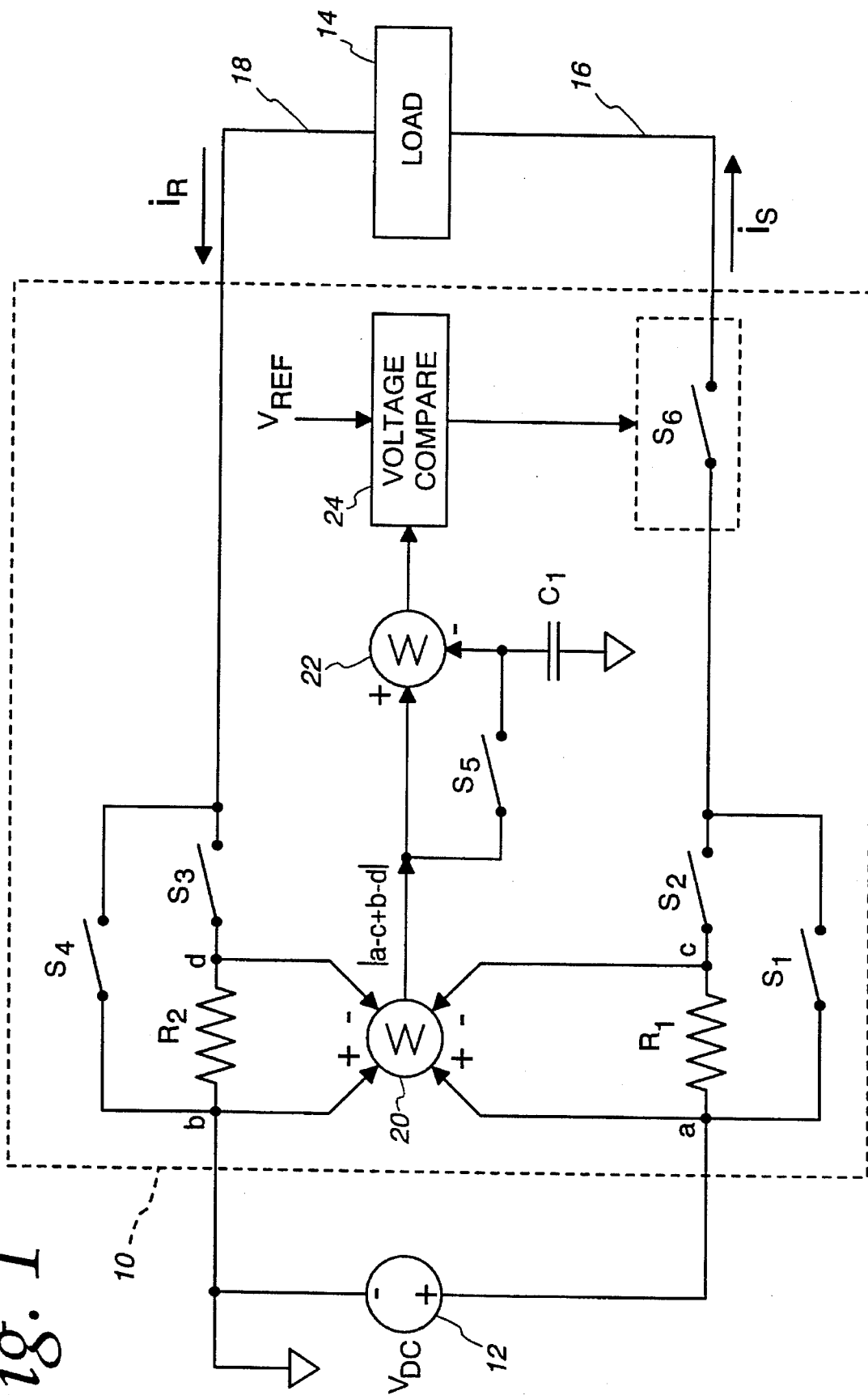
FIG. 1 is a schematic diagram of a ground fault interrupter embodying the present invention showing the ground fault interrupter disposed between a DC power source and a load.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings, FIG. 1 illustrates a ground fault interrupter 10 for a DC circuit including a DC power source 12 and a load 14. The DC source 12 supplies DC current $i_s$ to the load 14 along a supply current path 16 and receives DC current $i_R$ from the load 14 along a return current path 18. During normal operation of the DC circuit, the DC supply current $i_s$ should be substantially equal to the DC return current $i_R$. During a ground fault, however, the return current $i_R$ is not equal to the supply current $i_s$ because some of the current in the DC circuit is being diverted to a conductive path other than the return current path 18. The ground fault interrupter 10 disconnects the power source 12 from the load 14 in response to a ground fault exceeding a predetermined threshold.

In general, the ground fault interrupter 10 comprises a sense resistor $R_1$ in series with the supply current path 16, a sense resistor $R_2$ in series with the return current path 18, and a circuit breaker switch $S_6$ disposed in series with the supply current path 16. The resistors $R_1$ and $R_2$ preferably have the same value. The circuit breaker switch $S_6$ interrupts the supply current path 16 in response to actuation of the switch $S_6$. In an alternative embodiment, the circuit breaker switch $S_6$ is disposed in series with the return current path 18 so that the circuit breaker switch $S_6$ interrupts the return current path 18 in response to actuation of the switch $S_6$. The ground fault interrupter 10 further includes a measurement unit, including summing networks 20 and 22 and a voltage comparator 24, for measuring first and second voltage drops across the respective resistors $R_1$ and $R_2$. While accounting for possible offset and measurement unit errors, the measurement unit compares a difference between the first and second voltage drops to a predetermined threshold and actuates the switch $S_6$ in response to the voltage difference exceeding the predetermined threshold. Actuation of the switch $S_6$ removes power from the load 14. The ground fault interrupter 10 is described in detail below.

To measure the difference between the return current $i_R$ and the supply current $i_s$, the ground fault interrupter 10 employs the two sense resistors $R_1$ and $R_2$, six switches $S_1$ through $S_6$, a capacitor $C_1$, and the summing networks 20 and 22 and the voltage comparator 24. The resistor $R_1$ is used to sense the supply current $i_s$ from the DC source 12 flowing through the supply current path 16, while the resistor $R_2$ is used to sense the return current $i_R$ flowing through the return current path 18. To compare the currents flowing through the resistors $R_1$ and $R_2$, the summing network 20 calculates the difference between the voltage drop across the sense resistor $R_1$ and the voltage drop across the sense resistor $R_2$. More specifically, the summing network 20 subtracts the voltages at terminals c and d from the voltages at terminals a and b. If the currents flowing through the resistors $R_1$ and $R_2$ are identical, the absolute value of (a−c+b−d) should ideally be equal to zero. If, however, the currents flowing through the resistors $R_1$ and $R_2$ are different, the absolute value of (a−c+b−d) should be equal to some non-zero value.

The ground fault interrupter 10 continuously cycles through four states until a circuit-interrupting ground fault is measured. These four states will be referred to herein as a calibration state, a first transition state, a measurement state, and a second transition state. After the second transition state, the ground fault interrupter 10 returns to the calibration state. In the preferred embodiment, each state lasts for approximately 10 milliseconds. The switches $S_1$ through $S_5$ are selectively opened and closed to move the ground fault interrupter 10 from state to state. The switch $S_6$ remains closed until a circuit-interrupting ground fault is detected. Detection of a circuit-interrupting ground fault opens the switch $S_6$.

In the calibration state, switches $S_1$, $S_4$, and $S_5$ are closed, while switches $S_2$ and $S_3$ are open. Current flows from the DC source 12, through the load 14, and back to the source 12. The open switches $S_2$ and $S_3$ cause the supply and return currents $i_s$ and $i_R$ to bypass the respective sense resistors $R_1$ and $R_2$ and, instead, flow through the current paths containing the respective switches $S_1$ and $S_4$. Since no current should flow through the resistors $R_1$ and $R_2$, the voltage drop across each of these two resistors $R_1$ and $R_2$ should ideally be zero. Accordingly, the absolute value of (a−c+b−d) as calculated by the summing network 20 should ideally be zero. Any calculated voltage value other than zero is due to offsets and errors in the summing network 20. Since the switch $S_5$ is closed during the calibration state, any non-zero voltage value is stored on the capacitor $C_1$. This non-zero voltage value may interchangeably be referred to as an offset voltage, calibration voltage, or nulling voltage. During the measurement state discussed below, the summing network 22 subtracts the nulling voltage from the output of the summing network 20.

Following the calibration state, the ground fault interrupter 10 enters the first transition state. In the first transition state, switches $S_1$, $S_2$, $S_3$, and $S_4$ are closed, while switch $S_5$ is open. During normal operation of the ground fault interrupter 10, the switches $S_1$ and $S_2$ should never be open at the same time and the switches $S_3$ and $S_4$ should never be open at the same time. Otherwise, the load 14 would become momentarily disconnected from the power source 12, thereby causing power interruptions. The first transition state prevents the possibility of power interruption while changing from the calibration state to the measurement state by dosing switches $S_1$, $S_2$, $S_3$, and $S_4$. Switch $S_6$, of course, remains closed unless a circuit-interrupting ground fault has been detected. Switch $S_5$ is open so that the nulling voltage is held in the capacitor $C_1$.

Following the first transition state, the ground fault interrupter 10 enters the measurement state. In the measurement state, switches $S_2$ and $S_3$ are closed, while switches $S_1$, $S_4$, and $S_5$ are open. The open switches $S_1$ and $S_4$ cause the supply and return currents $i_s$ and $i_R$ to flow through the respective sense resistors $R_1$ and $R_2$. Switch $S_5$ is open so that the nulling voltage is held in the capacitor $C_1$. The summing network 20 calculates the difference between the voltage drops across the resistors $R_1$ and $R_2$ by taking the absolute value of (a−c+b−d), and the summing network 22 subtracts the nulling voltage stored in capacitor $C_1$ from this calculated difference. The output of the summing network 22 represents a difference in the current $i_s$ supplied to the load 14 and the current $i_R$ returned from the load 14.

Although any difference between the supply and return currents $i_s$ and $i_R$ is defined as a ground fault, the voltage comparator 24 only actuates the switch $S_6$ to interrupt the supply current path 16 and remove power from the load 14 if the output of the summing network 22 exceeds a predetermined threshold $V_{Ref}$ selected based upon safety considerations. In the preferred embodiment, the predetermined threshold $V_{Ref}$ corresponds to a current difference of 10 milliamperes. It, however, should be apparent that this threshold may be modified to be some other value. If the output of the summing network 22 is greater than the predetermined threshold $V_{Ref}$, the switch $S_6$ is opened. The switch $S_6$ remains open until the entire DC circuit is re-initialized. For safety reasons, the DC circuit does not apply power following detection of a circuit-interrupting ground fault. The nulling voltage and the predetermined threshold $V_{Ref}$ are AC coupled to prevent noise from causing the comparator 24 to open the switch $S_6$.

One important application of the ground fault interrupter 10 is in airborne telephone systems. In an airborne telephone system, the DC power source 12 is a −48 volt DC supply, the maximum supply current $i_s$ is 2 amperes, and the load 14 includes a passenger telephone handset. Since the voltage source 12 is a negative voltage source, the "+" and "−" signs of the voltage source 12 would be transposed from the positions illustrated in FIG. 1. Furthermore, the direction of current flow through the supply current path 16 and the return current path 18 would be reversed so that the arrow accompanying the supply current $i_s$ in FIG. 1 would point from the load 14 toward the voltage source 12 and the arrow accompanying the return current $i_R$ would point toward the load 14. The sense resistors $R_1$ and $R_2$ have relatively small resistance values in order to minimize power loss. To prevent more than 0.25 watts of power loss, the two resistors $R_1$ and $R_2$ each must be less than 30 milliohms. In the preferred embodiment, the two resistors $R_1$ and $R_2$ each have values of 20 milliohms. The ground fault interrupter 10 measures the supply current $i_s$ flowing toward the −48 volt DC supply and insures that the current $i_R$ flowing into the telephone handset is within 10 milliamperes of the supply current $i_s$. A current difference between the supply current $i_s$ and return current $i_R$ of greater than 10 milliamperes may pose a safety hazard. A current of 10 milliamperes flowing through a resistance of 20 milliohms generates a voltage drop of 200 microvolts. Thus, the predetermined threshold $V_{Ref}$ in terms of volts is preferably 200 microvolts. In the event that a failure occurs in a telephone handset and the output of the summing network 22 is greater than 200 microvolts, the voltage comparator 24 causes the switch $S_6$ to open. Opening the switch $S_6$ disconnects the −48 volt DC supply from the telephone handset so as to prevent the passenger from being exposed to an accidental shock.

Following the measurement state, the ground fault interrupter 10 enters the second transition state. The switch configuration in the second transition state is identical to the switch configuration during the first transition state. In particular, switches $S_1$, $S_2$, $S_3$, and $S_4$ are closed, while switch $S_5$ is open. Like the purpose of the first transition state, the purpose of the second transition state is to prevent the switches $S_1$ and $S_2$ from being open at the same time and prevent the switches $S_3$ and $S_4$ from being open at the same time. The second transition state prevents the possibility of power interruption while changing from the measurement state to the calibration state by closing switches $S_1$, $S_2$, $S_3$, and $S_4$. Switch $S_6$, of course, remains closed unless a circuit-interrupting ground fault has been detected. Switch $S_5$ is open so that the nulling voltage is held in the capacitor $C_1$.

Following the second transition state, the ground fault interrupter 10 returns to the calibration state. The ground fault interrupter 10 continuously cycles through the calibration state, the first transition state, the measurement state, and the second transition state, selectively opening and closing the switches $S_1$ through $S_5$ in accordance with the state table given below:

| STATE NAME | $S_1$ | $S_2$ | $S_3$ | $S_4$ | $S_5$ | $S_6$ |
|---|---|---|---|---|---|---|
| Calibration | ON | OFF | OFF | ON | ON | ? |
| Transition | ON | ON | ON | ON | OFF | ? |
| Measurement | OFF | ON | ON | OFF | OFF | ? |
| Transition | ON | ON | ON | ON | OFF | ? |

Opening and closing of the switches is accomplished by means of conventional control circuitry. As indicated above, the duration of each state is 10 milliseconds.

While the present invention has been described with reference to one or more particular embodiments, those skilled in the art will recognize that many changes may be made thereto without departing from the spirit and scope of the present invention.

For example, the measurement unit employs voltmeters, a microcomputer, and a memory in lieu of the summing networks 20 and 22, the capacitor $C_1$, and the voltage comparator 24. The voltmeters measure the voltage drops across the respective sense resistors $R_1$ and $R_2$. During the calibration state, the microcomputer stores a nulling voltage in the memory, where a non-zero nulling voltage may be caused by offsets and voltmeter errors. During the measurement state, the microcomputer subtracts the nulling voltage from the difference between the voltage drops and compares this measured result with a predetermined threshold $V_{Ref}$ stored in the memory. If the measured result exceeds the predetermined threshold $V_{Ref}$, the microcomputer causes the circuit breaker switch $S_6$ to interrupt the supply current path 16.

In another embodiment, the sense resistors $R_1$ and $R_2$ may be modified to have unequal resistance values. In the absence of a ground fault, the supply current $i_s$ is identical to the return current $i_R$. Therefore, if the resistors $R_1$ and $R_2$ have unequal values, the voltage drop across the resistor $R_2$ should ideally differ from the voltage drop across the resistor $R_1$ by a specific non-zero value. The voltage comparator 24 only causes the switch $S_6$ to open if the measured difference between the voltage drops across these two resistors $R_1$ and $R_2$ differs from this specific non-zero value by a predetermined threshold $V_{Ref}$.

Each of these embodiments and obvious variations thereof is contemplated as falling within the spirit and scope of the claimed invention, which is set forth in the following claims.

What is claimed is:

1. A ground fault interrupter, operable in a measurement state and a calibration state, for a DC circuit having a DC source and a load, the DC source supplying DC current to the load along a supply current path and receiving DC current from the load along a return current path, the ground fault interrupter comprising:

a first resistance in series with the supply current path;

a second resistance in series with the return current path;

a current interrupter, disposed in series with one of the current paths, for interrupting the one of the current paths in response to actuation of said current interrupter;

a measurement unit for measuring voltage drops across said respective first and second resistances during the measurement state, obtaining a measurement value using a difference between the voltage drops during the measurement state, and comparing said measurement value to a predetermined threshold, said measurement unit constructed and arranged to actuate said current interrupter in response to said measurement value exceeding said predetermined threshold; and a first switch disposed in series with said first resistance, a second switch disposed in parallel to said first switch and said first resistance, a third switch disposed in series with said second resistance, and a fourth switch disposed in parallel to said third switch and said second resistance, said first, second, third, and fourth switches being operable to switch the ground fault interrupter between said measurement state and said calibration state.

2. The ground fault interrupter of claim 1, wherein during the calibration state, said first switch is open and said second switch is closed to cause the supplied current on the supply current path to bypass said first resistance and flow through said second switch, said third switch is open and said fourth switch is closed to cause the returned current on the return current path to bypass said second resistance and flow through said fourth switch, said measurement unit measures voltage drops across said respective first and second resistances during the calibration state, said measurement unit calculates an error voltage equal to a difference between the voltage drops during the calibration state, and said measurement unit stores said error voltage in a storage unit, and wherein during the measurement state, said first switch is closed and said second switch is open to cause the supplied current on the supply current path to flow through said first resistance, said third switch is closed and said fourth switch is open to cause the returned current on the return current path to flow through said second resistance.

3. The ground fault interrupter of claim 2, wherein said storage unit includes a capacitor.

4. The ground fault interrupter of claim 2, wherein the ground fault interrupter is further operable in first and second transition states, the first, second, third, and fourth switches being closed during the first and second transition states, the ground fault continuously cycling through the calibration state, the first transition state, the measurement state, and the second transition state until the measurement unit actuates the current interrupter.

5. The ground fault interrupter of claim 2, wherein said measurement unit includes a first summing network coupled to opposing terminals of said first resistance and coupled to opposing terminals of said second resistance, said first summing network measuring the voltage drops across said respective first and second resistances during the calibration state and the measurement state and calculating the difference between the voltage drops during each of the calibration state and the measurement state.

6. The ground fault interrupter of claim 5, wherein said measurement unit includes a second summing network for subtracting said error voltage from the difference between the voltage drops during the measurement state to obtain said measurement value.

7. The ground fault interrupter of claim 6, wherein said measurement unit includes a voltage comparator for comparing said measurement value to said predetermined threshold.

8. A ground fault interrupter, operable in a calibration state and a measurement state, for a DC circuit having a DC source and a load, the DC source supplying DC current to the load along a supply current path and receiving DC current from the load along a return current path, the ground fault interrupter comprising:

a first resistance in series with the supply current path;

means for bypassing said first resistance during the calibration state;

a second resistance in series with the return current path;

means for bypassing said second resistance during the calibration state;

a current interrupter, disposed in series with one of the current paths, for interrupting the one of the current paths in response to actuation of said current interrupter; and a measurement unit for
measuring voltage drops across said respective first and second resistances during the calibration state,
calculating an error voltage equal to a difference between the voltage drops during the calibration state,
storing said error voltage in a storage unit during the calibration state,
measuring voltage drops across said respective first and second resistances during the measurement state,
subtracting said error voltage from a difference between the voltage drops during the measurement state to obtain a measurement value, and
comparing said measurement value to a predetermined threshold, said measurement unit constructed and arranged to actuate said current interrupter in response to said measurement value exceeding said predetermined threshold.

9. The ground fault interrupter of claim 8, wherein said means for bypassing said first resistance during the calibration state includes a first switch disposed in series with said first resistance and a second switch disposed in parallel to said first resistance and said first switch, said first switch being open and said second switch being closed to cause the supplied current on the supply current path to bypass said first resistance and flow through said second switch during the calibration state, said first switch being closed and said second switch being open to cause the supplied current to flow through said first resistance during the measurement state.

10. The ground fault interrupter of claim 9, wherein said means for bypassing said second resistance during the calibration state includes a third switch disposed in series with said second resistance and a fourth switch disposed in parallel to said second resistance and said third switch, said third switch being open and said fourth switch being closed to cause the returned current on the return current path to bypass said second resistance and flow through said fourth switch during the calibration state, said third switch being closed and said fourth switch being open to cause the returned current to flow through said second resistance during the measurement state.

11. The ground fault interrupter of claim 9, wherein the ground fault interrupter is further operable in first and second transition states, the first, second, third, and fourth switches being closed during the first and second transition states, the ground fault continuously cycling through the calibration state, the first transition state, the measurement state, and the second transition state until the measurement unit actuates the current interrupter.

12. The ground fault interrupter of claim 8, wherein said measurement unit includes a first summing network coupled to opposing terminals of said first resistance and coupled to opposing terminals of said second resistance, said first summing network measuring the voltage drops across said respective first and second resistances during the calibration state and the measurement state and calculating the difference between the voltage drops during each of the calibration state and the measurement state.

13. The ground fault interrupter of claim 12, wherein said measurement unit includes a second summing network for subtracting said error voltage from the difference between the voltage drops during the measurement state to obtain said measurement value.

14. The ground fault interrupter of claim 8, wherein said measurement unit includes a voltage comparator for comparing said measurement value to said predetermined threshold.

15. The ground fault interrupter of claim 8, wherein said storage unit includes a capacitor.

16. A ground fault interrupter, operable in a calibration state and a measurement state, for a DC circuit having a DC source and a load, the DC source supplying DC current to the load along a supply current path and receiving DC current from the load along a return current path, the ground fault interrupter comprising:

a first resistance in series with the supply current path;

a first bypass current path disposed in parallel to said first resistance;

first switching means for permitting the supplied current to substantially flow through said first bypass current path during the calibration state and for permitting the supplied current to substantially flow through said first resistance during the measurement state;

a second resistance in series with the return current path;

a second bypass current path disposed in parallel to said second resistance;

second switching means for permitting the returned current to substantially flow through said second bypass current path during the calibration state and for permitting the returned current to substantially flow through said second resistance during the measurement state;

a current interrupter, disposed in series with one of the current paths, for interrupting the one of the current paths in response to actuation of said current interrupter; and a measurement unit for
measuring voltage drops across said respective first and second resistances during the calibration state,
calculating an error voltage equal to a difference between the voltage drops during the calibration state,
storing said error voltage in a storage unit during the calibration state,
measuring voltage drops across said respective first and second resistances during the measurement state,
subtracting said error voltage from a difference between the voltage drops during the measurement state to obtain a measurement value, and
comparing said measurement value to a predetermined threshold, said measurement unit constructed and arranged to actuate said current interrupter in response to said measurement value exceeding said predetermined threshold.

* * * * *